United States Patent
Wegner

[11] Patent Number: 5,724,765
[45] Date of Patent: Mar. 10, 1998

[54] HERBICIDE APPLICATOR WITH VEGETATION GRABBING JAWS

[76] Inventor: Walter A. Wegner, 3805 Hwy. E South, Pittsville, Wis. 54466

[21] Appl. No.: 589,282

[22] Filed: Jan. 22, 1996

[51] Int. Cl.[6] .......................... A01G 13/00; A01C 23/00
[52] U.S. Cl. ............................................................. 47/1.5
[58] Field of Search ................... 47/1.5, 1.7, 1 M, 47/1.01

[56] References Cited

U.S. PATENT DOCUMENTS

| | | | |
|---|---|---|---|
| 4,357,779 | 11/1982 | Maddock | 47/1.5 |
| 4,369,596 | 1/1983 | Hartford | 47/1.5 |
| 4,597,219 | 7/1986 | Kropf | 47/1.5 |
| 4,688,959 | 8/1987 | Snedeker et al. | 47/1.5 |
| 4,716,677 | 1/1988 | Moore | 47/1.5 |
| 4,803,801 | 2/1989 | Nelson, Jr. | 47/1.5 |
| 4,908,981 | 3/1990 | Moore | 47/1.5 |
| 5,329,277 | 7/1994 | Dixon | 47/1.5 |
| 5,499,474 | 3/1996 | Knooihuizen | 47/1.5 |

FOREIGN PATENT DOCUMENTS

| | | | |
|---|---|---|---|
| 490514 | 1/1930 | German Dem. Rep. | 47/1.5 |
| 929758 | 7/1955 | German Dem. Rep. | 47/1.5 |
| 428721 | 10/1974 | U.S.S.R. | 47/1.5 |
| 1026737 | 7/1983 | U.S.S.R. | 47/1.5 |
| 1033105 | 8/1983 | U.S.S.R. | 47/1.5 |

*Primary Examiner*—Terry Lee Melius
*Assistant Examiner*—Joanne C. Downs
*Attorney, Agent, or Firm*—Quarles & Brady

[57] ABSTRACT

Liquid herbicide be applied to individual weeds with an apparatus that includes a shaft to which a herbicide reservoir is attached. A pair of opposing jaws is pivotally attached to a one end of the shaft. Each jaw includes a plate with a surface from which a plurality of needles project and an absorbent pad into which the needles extend. A user operable pump is mounted on the shaft and a conduit coupling an inlet of the pump to the reservoir. Another conduit couples the outlet of the pump to the absorbent pad on each jaw. An lever, at the other end of the shaft, is connected to the pair of jaws by a cable. When a user moves the lever, the pair of opposing jaws pivot into a position at which that the weed is grasped between the absorbent pads with the needles penetrating the weed. Herbicide, in the absorbent pads, coats the surface of the weed and then flows into holes produced by the needles.

16 Claims, 2 Drawing Sheets

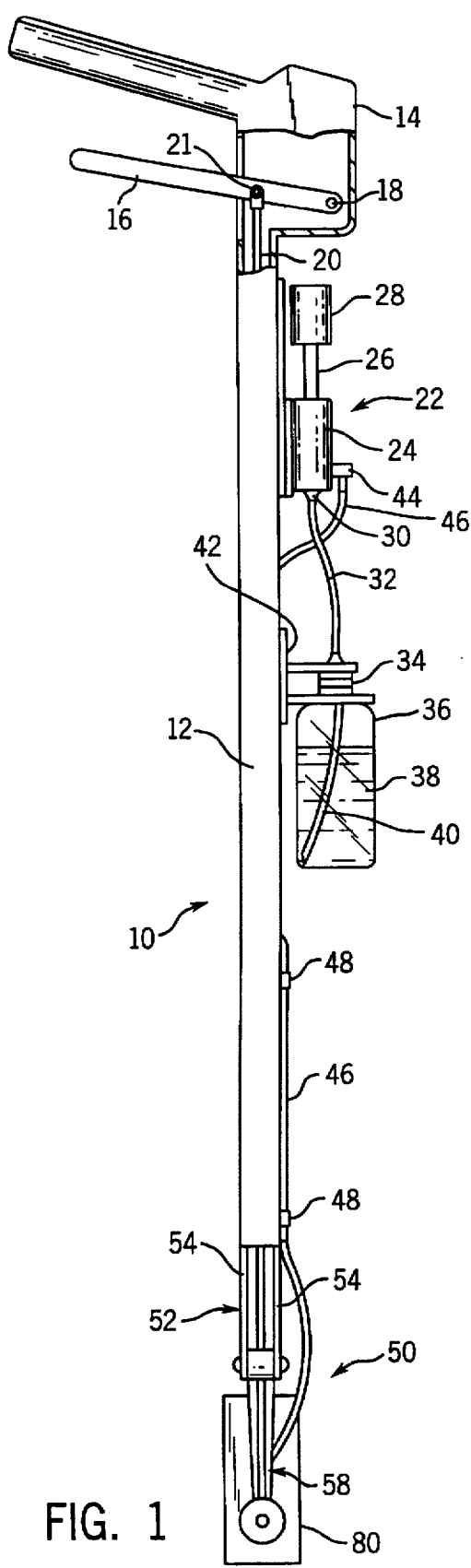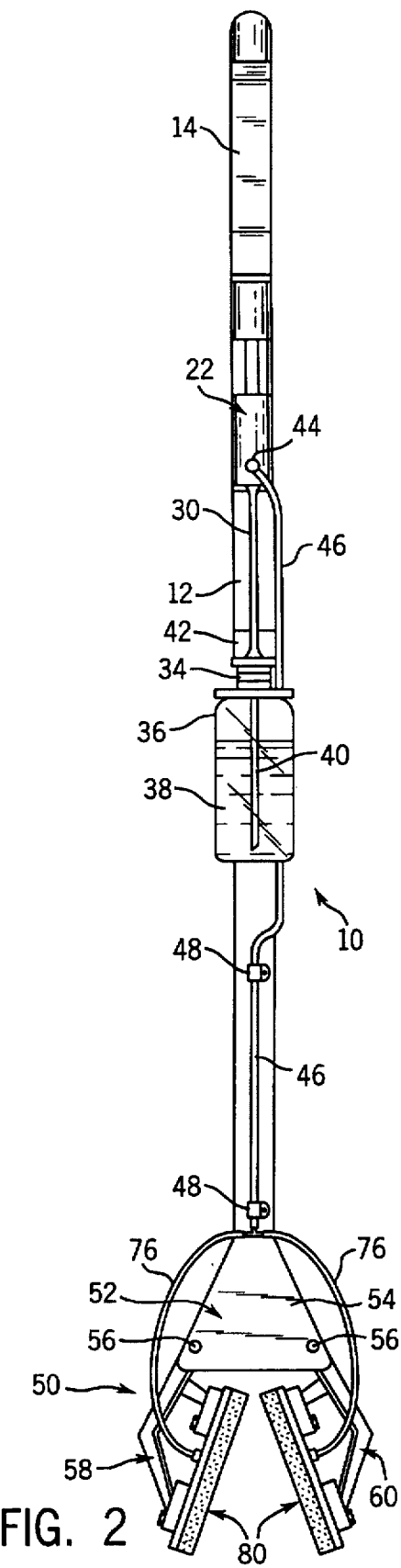

HERBICIDE APPLICATOR WITH VEGETATION GRABBING JAWS

BACKGROUND OF THE INVENTION

The present invention relates to apparatus for applying liquid chemicals to plants; and more particularly to apparatus for localized application of a herbicide directly to a specific plant.

Herbicides are commonly used to rid a lawn or garden of undesirable vegetation, such as weeds. Herbicides frequently come in liquid form and can be sprayed in a broadcast manner over the entire lawn or garden, in which case the herbicide is designed to attack only undesirable types of vegetation. However, certain herbicides affect both the undesirable vegetation and certain desirable plants thus making broadcast application infeasible. Further, broadcast application consumes a greater amount of the liquid than localized application to only the undesirable plants.

For situations where it is undesirable to broadcast the herbicide, various applicators have been developed to locally apply the chemical to specific plants. One common device resembles a cane which has a tubular body that is filled with liquid herbicide. A valve at the bottom end of the cane allows the herbicide to flow from the cane when the end is pressed against an undesirable plant. The cane has an extremely limited area of application and may not be optimal for use with weeds having extremely broad leaves without repeated treatment. Furthermore, topical application of the herbicide does not always ensure penetration into the plant for systemic action before being washed or rubbed away.

SUMMARY OF THE INVENTION

A general object of the present invention is to provide an apparatus for applying a liquid to unwanted vegetation.

Another object is to provide an apparatus for locally applying herbicide only to the unwanted vegetation.

A further object of the present invention is to provide a herbicide applicator which punctures the leaves of the plant thereby providing holes through which the herbicide enters the plant.

These and other objects are fulfilled by an applicator for applying a liquid to a plant which includes a shaft with a pair of opposing jaws. Each jaw has an absorbent pad attached thereto and in the preferred embodiment a plurality of needles project from the jaw into the pad to pierce the plant. A reservoir for the liquid is provided and a conduit carries the liquid from the reservoir to the absorbent pad on each jaw. An actuator is coupled to the pair of opposing jaws and when operated by a user, moves the jaws bringing the absorbent pads together to grasp the plant there between. The preferred embodiment also has a pump which forces the liquid from the reservoir through the conduit to the absorbent pads.

This applicator enables an individual plant to be grasped by the jaws and the liquid, such as a herbicide, to be applied just to that plant without treating neighboring plants. Thus, chemicals can be selectively applied only to those plants that a user desires to treat, avoiding harm to other plants.

BRIEF DESCRIPTION OF THE DRAWINGS

FIG. 1 is a side view of an apparatus according to the present invention;

FIG. 2 is a front view of the apparatus in FIG. 1;

DETAILED DESCRIPTION OF THE INVENTION

Figure 3:
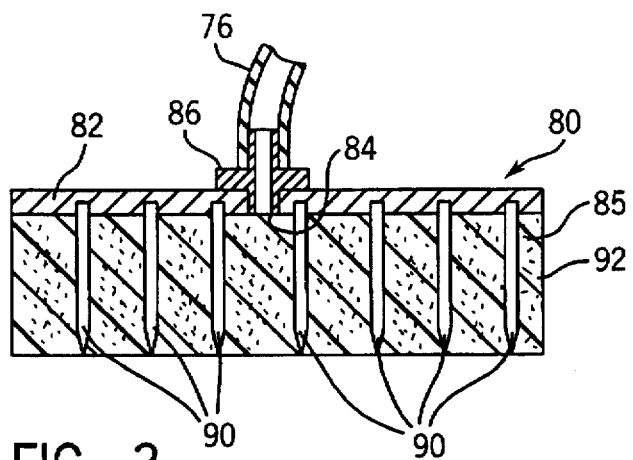
FIG. 3 is a cross sectional view through one of the applicators of the apparatus.

With initial reference to FIGS. 1 and 2, a herbicide applying apparatus 10 has a square, tubular shaft 12 with a pistol-grip handle 14 at one end. A trigger lever 16 is pivotally mounted within the handle 14 by a bolt 18. An actuating cable 20 is attached by a pin 21 on the trigger lever 16. The user of the apparatus 10 is able to squeeze the trigger with respect to the handle 14 raising the trigger upward in the orientation shown in FIG. 1 thereby pulling the cable 20 upward through the hollow shaft 12. Mounted on a front side of the shaft 12, spaced from the handle 14, is a fluid pump 22. The pump 22 comprises a cylinder 24 with a piston therein and connected to a rod 26 with a knob 28 at an exposed end. The pump 22 has an inlet with a one-way inlet check valve 30, which is connected by a tube 32 to the lid 34 of a plastic jar 36 containing liquid herbicide 38. A syphon tube 40 extends downward from the lid 34 into the jar 36. The jar 36 is attached to the shaft 12 by a bracket 42 which allows removal of the jar and lid for either refilling or replacement with a full jar of herbicide. The one-way inlet check valve 30 at the inlet of pump 22 permits the liquid herbicide to flow only from the jar 36 into the pump cylinder 24 and prevents the reverse flow.

The pump cylinder 24 has an outlet at which is attached a one-way outlet check valve 44 that permits the herbicide to flow only from the cylinder through the outlet. The outlet check valve 44 has a feed tube 46 attached thereto and extending along the shaft 12 to the end of the shaft which is remote from handle 14. A number of clips 48 hold the feed tube 46 to the shaft.

A herbicide applicator 50 is attached to the other end of the shaft 12. Specifically a bracket 52 has a pair of parallel, spaced-apart, triangular plates 54. The triangular plates 54 are attached at one apex to opposite sides of the remote end of shaft 12. A pair of pins 56 pivotally attach two opposing jaws 58 and 60 to the bracket 52.

Figure 5:
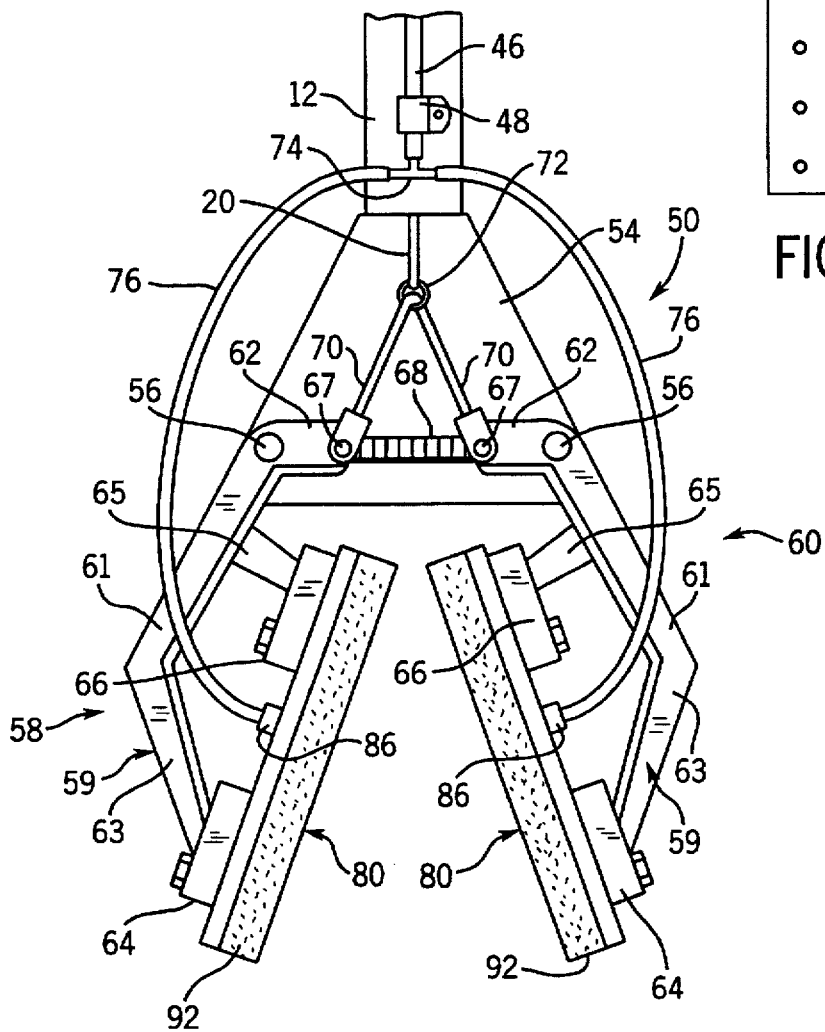
FIG. 5 is an enlarged drawing of the applicator jaws with a cover removed to show the internal operating mechanism.

The details of the attachment of the jaws are shown in FIG. 5. Each jaw 58 and 60 has an arm 59 with a center section 61 from one end of which an actuator section 62 extends at approximately a 45° angle. One of the pivot pins 56 passes through an aperture in each jaw near the junction of sections 61 and 62. An applicator section 63 of each jaw 58 and 60 extends at approximately a 45° angle from the other end of each center section 61 terminating in a flat support 64. A support stub 65 extends from the center section 61 of each jaw arm 59 toward the opposing jaw and terminates in another flat support 66. The actuator section 62 of each jaw arm has an aperture at the remote end with coupling pins 67 therein. An expansion spring 68 is attached between the coupling pins 67 of the two jaw arms 59 and biases the jaws 58 and 60 apart into an open state illustrated in FIG. 5. A separate leader cable 70 also is connected to each coupling pin 67 and to a ring 72 at the end of the cable 20 which extends through the shaft 12.

Figure 4:
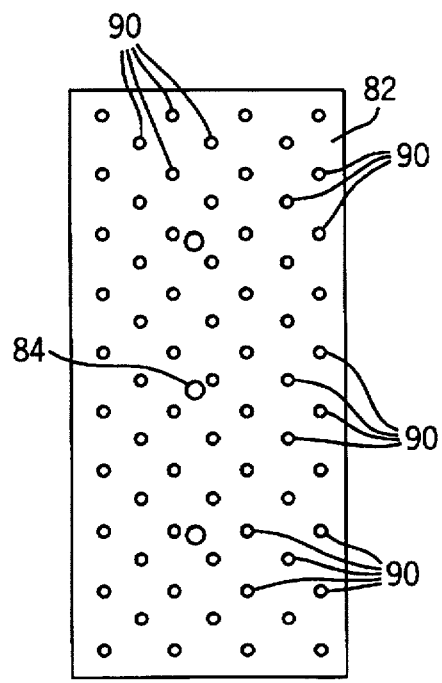
FIG. 4 is a plan view of the surface of a plate which forms part of the applicator.

With reference to FIGS. 3, 4 and 5, a herbicide applicator 80 has an applicator plate 82 which is bolted to supports 64 and 66 of each jaw 58 and 80. An aperture 84 is centrally located in the rectangular applicator plate 82 and has a tubular fitting 86 inserted therein. A separate applicator tube extends from the tubular fitting 86 to a T coupling 74 at the remote end of the feed tube 46 from the pump outlet. A plurality of pointed needles 90 project from the major surface of the applicator plate 82 that is opposed to the tubular coupling 86. The needles 90 are arranged in staggered rows as shown in FIG. 4. The needles 90 are pushed into a rectangular absorbent pad 92, such as sponge, until the sponge rests against the major surface 85 of applicator plate 82.

In order to use the apparatus 10, the user fills the jar 36 with the liquid herbicide to be applied and secures the jar to bracket 42 on the shaft 12. The user then operates the pump 22 by pushing the knob 28 toward the pump cylinder 24 and then moving the knob away from the cylinder 24. The latter action draws liquid from the jar 36 up through the tubes 40 and 32, through the inlet check valve 30 and into the cylinder 24. The user again pushes the knob 28 toward the cylinder so that the piston on the internal end of rod 26 pushes the fluid through the outlet check valve 44 and into the feed tube 46. At this time the inlet check valve 30 prevents the fluid from flowing out the inlet and back into the jar 36. The liquid herbicide ejected from the pump cylinder 24 travels through the feed tube 46 and T coupling 74 into each applicator tube 76, finally reaching the applicators 80. The liquid then is injected into each absorbent pad 92. The pump 22 is repeatedly operated in this cycle until the absorbent pads 92 are sufficiently saturated with the herbicide. One does not wish to saturate the absorbent pads 92 so completely that herbicide drips there from onto the ground.

With the absorbent pads properly saturated with herbicide, the user positions the apparatus with a weed located between the jaws 58 and 60. The user then squeezes the trigger lever 16 against the handle 14 drawing the cable 20 upward through the tubular shaft 12 in the orientation of the device shown in the drawings. With reference particularly to FIG. 5, as the cable 20 is drawn upward through the shaft 12, the actuator section 62 of each jaw arm 59 is pulled upward causing the jaws 58 and 60 to pivot about pins 56. This action brings the applicators 80 together so that the weed, and particularly the leaves of the weed, are clamped between the absorbent pads 92. Further action of the trigger lever 16 forces the needles 90 of each jaw into the weed. It should be noted that the needles of one jaw plate 82 are offset from those on the opposing plate so as interdigitate as the jaws close.

When the jaws are closed fully, the needles 90 puncture the weed and liquid herbicide is applied from the absorbent pads to the outer surfaces of the weed. Then the user releases trigger lever 16 and the spring 68 retracts drawing the jaws 58 and 60 apart into the position shown in the drawings. With the jaws again open, the apparatus 10 can be moved to another weed where the treatment procedure is repeated. After application of the herbicide to several weeds, the user operates the pump 22 once or twice to replenish the liquid herbicide in the absorbent pads 92.

The present apparatus 10 allows the user to selectively apply the herbicide to individual weeds. Thus in a garden or heavily planted area, the herbicide can be applied locally to only those plants which are to be eradicated. The herbicide does not come into contact with desirable plants.

As an alternative, the pump 22 could be coupled to the trigger lever 16 so that operation of the trigger lever closes the jaws 58 and 60 and also pumps herbicide from the jar 36 to the applicator 80. However, maintaining the operation of these two components separate enables the user to independently control the amount of herbicide that is supplied to absorbent pads 92.

The foregoing description is directed primarily to preferred embodiments of the invention. Although some attention was given to various alternatives within the scope of the invention, it is anticipated that skilled artisans likely will realize additional alternatives that are now apparent from the disclosure of those embodiments. For example, although the invention has been described in the context of applying a herbicide, it may be used to apply other types of liquid chemicals, such as pesticides and fertilizers. Accordingly, the scope of the invention should be determined from the following claims and not limited by the above disclosure.

I claim:

1. An apparatus for applying a liquid to a plant, said apparatus comprising:

a shaft;

a pair of opposing jaws movably attached to the shaft with each jaw having an absorbent pad attached thereto, the pair of opposing jaws having a plurality of needles which penetrate the plant when the pair of opposing jaws is moved together;

a reservoir for the liquid;

a conduit system which carries the liquid from the reservoir to the absorbent pad on each jaw; and an actuator coupled to the pair of opposing jaws and operable by a user to move the pair of opposing jaws so that the absorbent pads come together to grasp the plant there between.

2. The apparatus as recited in claim 1 further comprising a pump which causes liquid to flow from the reservoir through the conduit system to the absorbent pads.

3. The apparatus as recited in claim 1 wherein the absorbent pads are sponges.

4. The apparatus as recited in claim 1 wherein the actuator comprises a handle connected to the shaft and a lever pivotally attached to the handle, the lever being coupled to the pair of opposing jaws wherein movement of the lever causes the absorbent pads to come together.

5. The apparatus as recited in claim 4 wherein the shaft is tubular and the actuator comprises a cable extending through the shaft, and having one end connected to the lever and another end connected to the pair of opposing jaws.

6. The apparatus as recited in claim 1 wherein the reservoir is removably attached to the shaft.

7. The apparatus as recited in claim 1 further comprising a spring coupled to open the pair of opposing jaws upon release of the actuator by the user.

8. The apparatus as recited in claim 1 wherein the plurality of needles project into the absorbent pad attached to one of the pair of opposing jaws.

9. An apparatus for locally applying a liquid herbicide to a plant, said apparatus comprising:

a shaft with two ends;

a pair of opposing jaws pivotally attached to one end of the shaft, each jaw having a plate which has a surface from which a plurality of needles project and having an absorbent pad into which the plurality of needles extend;

a reservoir for the liquid herbicide;

a pump attached to the shaft and operable by the user, the pump having an inlet and an outlet;

a first conduit connecting the reservoir to the inlet of the pump;

a conduit system connecting the outlet of the pump to the absorbent pad on each jaw; and an actuator attached to another end of the shaft and coupled to the pair of opposing jaws, said actuator operable by a user to pivot the pair of opposing jaws to grasp the plant between the absorbent pads with the plurality of needles penetrating the plant.

10. The apparatus as recited in claim 9 wherein the reservoir is removably attached to the shaft.

11. The apparatus as recited in claim 9 wherein the absorbent pads are sponges.

12. The apparatus as recited in claim 9 wherein the plate of each jaw has an aperture therethrough and the conduit system communicates with the apertures.

13. The apparatus as recited in claim 9 wherein the actuator comprises a handle with a lever pivotally attached thereto, the lever being coupled to the pair of opposing jaws wherein movement of the lever causes the absorbent pads to come together.

14. The apparatus as recited in claim 13 wherein the shaft is tubular and the actuator comprises a cable extending through the shaft, with one end of the cable connected to the lever and another end connected to the pair of opposing jaws.

15. The apparatus as recited in claim 7 further comprising a first one-way check valve between the inlet of the pump and the first conduit; and a second one-way check valve between the outlet of the pump and the conduit system.

16. The apparatus as recited in claim 7 further comprising a spring coupled to open the pair of opposing jaws upon release of the actuator by the user.

* * * * *